United States Patent Office 3,026,275
Patented Mar. 20, 1962

3,026,275
PREPARATION OF CELLULAR POLYURETHANE PLASTICS
Karl Erwin Müller, Leverkusen-Bayerwerk, Hans Holtschmidt, Koln-Stammheim, Heinrich Morschel, Leverkusen, and Günther Braun, Leverkusen-Bayerwerk, Germany, assignors, by direct and mesne assignments, of one-half to Farbenfabriken Bayer Aktiengesellschaft, Leverkusen, Germany, a corporation of Germany, and one-half to Mobay Chemical Company, Pittsburgh, Pa., a corporation of Delaware
No Drawing. Filed June 6, 1956, Ser. No. 589,586
Claims priority, application Germany June 11, 1955
2 Claims. (Cl. 260—2.5)

This invention relates to new polyurethane foam and to a process for making the same. More particularly the invention is concerned with a process for producing elastic polyurethane foam wherein an hydroxyl polyether and/or an hydroxyl polythioether and a tertiary amine containing at least two functional groups capable of reacting with isocyanato groups are reacted with a polyisocyanate and water.

It is well known to produce rubber-like polyurethanes by reacting a polyether containing terminal hydroxyl groups with a diisocyanate and subsequently cross-linking the product thus obtained with water in the presence of a tertiary amine. It has also been proposed to make polyurethane foam from hydroxyl polyethers, excess polyisocyanate and water in the presence of a tertiary amine. However, in carrying out this reaction, difficulties are encountered since part of the carbon dioxide formed by the reaction of the water with the polyisocyanate escapes unused. This phenomenon is due to the fact that the reacting mixture does not yet have a sufficient degree of viscosity at the time when the carbon dioxide is evolved. In other words, the blowing effect of the carbon dioxide being formed cannot fully be used. Experiments have shown that it is impossible to overcome this difficulty by the use of conventional accelerators.

It is an object of the present invention to provide a process for producing polyurethane foam from hydroxyl polyethers or hydroxyl polythioethers, polyisocyanates, and water. Another object is to provide a process for the production of polyurethane foam from hydroxyl polyethers or hydroxyl polythioethers, polyisocyanates, and water wherein full use of the blowing effect of the carbon dioxide formed is made. A further object is to provide polyurethane foam which is superior in some of its properties to conventional polyurethane foam, derived from hydroxyl polyesters and polyisocyanates. Still further objects will appear hereinafter.

These objects are attained in accordance with the instant invention by reacting with excess polyisocyanate and water a hydroxyl polyether and/or a hydroxyl polythioether and a small amount of a tertiary amine containing at least two functional groups capable of reacting with isocyanato groups.

The process of the invention involves an incorporation of the tertiary amine containing at least two functional groups capable of reacting with isocyanato groups into the hydroxyl polyether or hydroxyl polythioether used as starting material. This results in an enlargement of the molecule as shown, for example, by an increase in the viscosity. In addition, there is brought about a substantial acceleration of the subsequent reaction with water. Finally, the polyurethane foam of the instant invention exhibits an increased tearing strength when compared with polyurethane foam obtained exclusively from polyethers or polythioethers, and water.

In accordance with a preferred embodiment of the process of the invention, the reaction is carried out in two steps. In the first stage, the hydroxyl polyether or hydroxyl polythioether and the tertiary amine containing at least two functional groups capable of reacting with isocyanato groups are reacted with a diisocyanate at room temperature or elevated temperature up to about 120° C. Higher reaction temperatures should not be permitted in order to avoid polymerization of NCO groups in the presence of tertiary amino groups. The amount of diisocyanate is so chosen that about 0.3% to about 3% free OH groups will remain after reaction with the hydroxyl polyether or hydroxyl polythioether. In this manner, there is obtained an isocyanate-modified polyether or polythioether containing tertiary nitrogen atoms and free hydroxyl groups. The cross-linking and foaming is brought about in a second stage by adding water and a further amount of diisocyanate, preferably at room temperature. Alternatively, the hydroxyl polyether or hydroxyl polythioether and the tertiary amine containing at least two functional groups capable of reacting with isocyanato groups can be reacted with excess diisocyanate in the first stage and the isocyanate-modified polyether or polythioether containing tertiary nitrogen atoms and free isocyanate groups thus produced can be cross-linked and converted into a plastic foam by adding water in a second stage. The reaction with excess diisocyanates is performed at room temperature or elevated temperature up to 120° C. It is preferred to avoid higher temperatures on the same reasons as above. Foaming can be conducted at room temperature. In both cases, tertiary amines containing no functional groups capable of reacting with isocyanato groups may be added as additional accelerators. Along with the hydroxyl polyethers or polythioethers there may be employed other polymeric compounds capable of reacting with polyisocyanates with formation of polyurethane plastics, such as hydroxyl polyesters and hydrogenation products of polymeric ketones.

Hydroxyl polyethers and hydroxyl polythioethers which are suitable for use in the process of the instant invention are compounds containing terminal hydroxyl groups and a plurality of divalent organic radicals linked by oxygen and/or sulfur atoms. They may be represented by the general formula

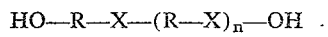

$$HO—R—X—(R—X)_n—OH \ .$$

in which R is a divalent organic radical, which may contain further OH groups, if a branched polyether is to be considered, X is oxygen or sulfur and $n$ is an integer.

Hydroxyl polyethers or polythioethers in which the divalent organic radical (R in the above formula) is an aliphatic radical, such as ethylene, (iso-)propylene and (iso-)butylene, are particularly suitable. However, the divalent organic radical may also be of cycloaliphatic or aromatic nature, such as p-xylylene and dimethyl-diphenylene-methane. The molecular weight of the hydroxyl polyethers or hydroxyl polythioethers can be within the range of 500–3,000, but it is more advantageous to use polyethers and polythioethers having a molecular weight below 2,000, which show a lower viscosity, and, therefore, can better be handled.

Representative examples of hydroxyl polyethers which may be used in the practice of the invention are linear and branched tetrahydrofuran polymers, such as are obtained by polymerization of tetrahydrofuran in the presence of acetic anhydride and perchloric acid and subsequent saponification (linear type) or by copolymerization of tetrahydrofuran and epichlorhydrin in the presence of iron chloride and sulfuryl chloride and subsequent reaction with butanediol (branched type). Reaction products of alkylene oxides with glycols and etherification products of glycols constitute other groups of suitable hydroxyl polyethers.

Illustrative examples of hydroxyl polythioethers which are suitable for use in the process of the invention include the reaction products of polyhydric alcohols with thioether glycols. They may be obtained by reacting a polyhydric alcohol with a thioether glycol in a molar ratio within the range of about 1:1 to about 1:1.5, using temperatures ranging from about 100° to about 300° C. and a dehydration catalyst, such as an aliphatic or aromatic sulphonic acid. Another method of producing suitable hydroxy polythioethers is the etherification of compounds of the general formula $$HO-R-(S-R')_n-S-R'-XH$$

in which R is ethylene or propylene, R' is a divalent organic radical the carbon chain of which may be interrupted by hetero atoms such as O and S, it further may be branched and the branchings may have terminal XH groups, $n$ is an integer and X is oxygen or sulfur. Such a compound can be self-condensed or condensed with another polyhydric alcohol or thioether alcohol to give a suitable hydroxyl polythioether.

A preferred group of tertiary amines containing at least two functional groups capable of reacting with isocyanato groups comprises compounds of the general formula

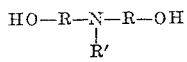

in which R stands for an alkylene group and R' for an alkyl, cycloalkyl or a substituted alkyl or cycloalkyl group, such as hydroxyethyl. Illustrative examples of tertiary amines represented by this formula are triethanolamine, dihydroxyethyl-cyclohexylamine and methyl diethanolamine. It is also possible to use compounds with several tertiary amino groups, such as, for example, the alkoxylation products of diethylene triamine and triethylene tetramine.

In order to incorporate the tertiary amine containing at least two functional groups capable of reacting with isocyanato groups into the hydroxyl polyether or hydroxyl polythioether, the components are reacted with a polyisocyanate. The amount of tertiary amine to be used depends upon the desired degree of acceleration. In general, the tertiary amine is used in an amount ranging from about 1 to 10% by weight, based on the weight of the hydroxyl polyether or hydroxyl polythioether.

Examples of polyisocyanates which may be employed in the practice of the invention include 2,4-toluylene diisocyanate, 2,6-toluylene diisocyanate and mixtures thereof, 4,4'-diphenylmethane diisocyanate, 1,5-naphthylene diisocyanate and 4,4'-dicyclohexyl-dimethyl-methane diisocyanate. In general, the polyisocyanate is used in such amount as to provide 1.2 to 3 isocyanato groups per 1 reactive group present in the reactive mixture.

As in the production of the conventional polyurethane plastics from hydroxy polyesters and excess polyisocyanate, the carbon dioxide acting as the blowing agent is formed by a reaction between the polyisocyanate component and water, the amount of water to be employed ranging from about 0.5 to 3% by weight, based on the weight of the hydroxyl polyether or hydroxyl polythioether.

In order to facilitate mixing of the components it is advisable to add a small amount of a surface active agent. The nature of the surface active agents and the amount to be employed are substantially the same as in the production of the known polyurethane plastics. Thus, amine salts of high molecular fatty acids or alkali salts of Turkey red oil may be used in quantities of 0.5 to 10% by weight, based on the weight of the hydroxyl polyether or hydroxyl polythioether.

As indicated above, the process of the invention may be carried out in the presence of the conventional accelerators. Representative examples of such accelerators include hexahydrodimethyl aniline, the adipic acid ester of diethanol amine, sodium phenolate and iron acetonylacetate. They may be added in an amount of 0.1 to 4% by weight, based on the weight of the hydroxyl polyether or hydroxyl polythioether.

As distinguished from conventional polyurethane foam, the polyurethane foam of the instant invention is stable to hydrolysis. Hydrolytic agents, such as hot water, steam, bases and acids, which attack the ester linkages of conventional polyurethane foam, do not have any appreciable effect on the polyurethane foam of the invention.

The polyurethane foam of the invention finds the same applications as the conventional polyurethane foam. It may be employed with particular advantage where resistance to hydrolytic degradation is required, such as in the production of upholstered articles for use under tropical conditions.

Details of the invention will be apparent from a consideration of the following examples, which are illustrative only and are in no way to be construed as limiting.

*Example 1*

10 g. of triethanolamine are added to 400 g. of a linear tetrahydrofuran polymer with terminal hydroxyl groups, the said polymer having a hydroxyl content of 6.6%; 90 g. of toluylene diisocyanate are then added dropwise at 90–100° C. while stirring. The mixture is heated for another half an hour at the same temperature and after cooling, a viscous oil is obtained which has a hydroxyl number of 77.

100 g. of the product are mixed by stirring with a mixture of 3 g. of the adipic acid ester of N-diethanolamine, 3 g. of diethylamine oleate and 2.5 g. of water, and thereafter 40 g. of toluylene diisocyanate are incorporated by stirring. After stirring for a short time, the mixture is poured into molds. The foaming process starts after about half a minute and the contents of the molds can be removed after 30 minutes. The foamed product formed has the following mechanical properties:

| Bulk weight, g/cc. | Elasticity, percent | Tearing strength | |
|---|---|---|---|
| | | Before boiling with water, kg./cm. | After boiling with water, kg./cm. |
| 0.07 | 24 | 1.47 | 1.46 |

*Example 2*

15 g. of methyl diethanolamine are added to 500 g. of a branched polyether with the hydroxyl number 78 (2.4% of OH), the said polyether being produced by copolymerization of tetrahydrofuran and epichlorhydrin and subsequent reaction with 1,4-butanediol; 50 g. of toluylene diisocyanate are then added dropwise at 90–100° C. The mixture is heated for a further half an hour and a highly viscous product are obtained with the OH number of 50.4.

100 g. of this product are stirred with a mixture of 2 g. of the adipic acid ester of N-diethyl ethanolamine, 3 g. of diethylamino oleate and 2 g. of water and 31 g. of toluylene diisocyanate (70:30) are mixed in by stirring. The foaming process starts after a short time. A foamed product is obtained with the following mechanical properties:

| Bulk weight, g/cc. | Elasticity, percent | Tearing strength | |
|---|---|---|---|
| | | Before boiling with water, kg./cm. | After boiling with water, kg./cm. |
| 0.039 | 35 | 1.29 | 0.9 |

*Example 3*

20 g. of triethanolamine are added to 1000 g. of a polythioether produced by condensation of equimolecular amounts of 1,4-butanediol and thiodiglycol and having an hydroxyl content of 5.48%, the triethanolamine being added after the polythioether has been carefully dehydrated in vacuo at 120° C. 200 g. of toluylene diisocyanate are then added dropwise at 90–100° C. while stirring and the mixture finally heated for one hour at 100° C. A viscous oil is obtained with the hydroxyl number 56.1.

100 g. of this product are stirred with a mixture of 3 g. of the adipic acid ester of N-diethyl ethanolamine, 2 g. of diethyl amino oleate and 2 g. of water and thereafter 31 g. of toluylene diisocyanate are incorporated by stirring. After stirring for a short time, the mixture is poured into molds. The foaming process starts after about half a minute, and the molds can be emptied after 30 minutes.

The foamed product obtained has the following mechanical properties:

| Bulk weight, g/cc. | Elasticity, percent | Tearing strength | |
|---|---|---|---|
| | | Before boiling with water, kg./cm. | After boiling with water, kg./cm. |
| 0.063 | 21 | 0.84 | 0.63 |

*Example 4*

45 g. of triethanolamine are added to 1500 g. of the polythioether according to Example 3 after the latter has been dehydrated, and thereafter 262.5 g. of toluylene diisocyanate are added dropwise at 90–100° C. The polyether obtained after further heating for one hour is a viscous oil with the hydroxyl number of 84.1.

A mixture of 2 g. of the adipic acid ester of N-diethyl ethanolamine, 2 g. of diethyl amino oleate and 2 g. of water, and thereafter 37 g. of toluylene diisocyanate are incorporated by stirring.

After a short time a foam is obtained with the following mechanical properties:

| Bulk weight, g/cc. | Elasticity, percent | Tearing strength | |
|---|---|---|---|
| | | Before boiling with water, kg./cm. | After boiling with water, kg./cm. |
| 0.090 | 22 | 0.81 | 0.79 |

*Example 5*

A mixture of 80 parts of polythioether of thiodiglycol and 1,4-butylene glycol according to Example 3, having the OH number 49, and 20 parts of a polyester of 27 mols of adipic acid, 27 mols of diethylene glycol and 1 mol of trimethylol propane with the OH number 60, is stirred with a mixture of 2 parts of the adipic acid ester of N-diethyl ethanolamine, 2 parts of diethyl amino oleate and 2 parts of water. Thereafter, 31 parts of toluylene dissocyanate are added. After stirring for a short time, the mixture is poured into molds. The foaming process starts after 30 minutes.

The foamed product which is obtained has the following mechanical properties.

Bulk weight _____ 0.060 g./cc.
Elasticity _____ 27%.
Tearing strength:
  Before boiling _____ 1.27 kg./cm.
  After boiling _____ 0.92 kg.%cm.
Tensile strength _____ 1.52 kg./cm.².
Elongation _____ 205%.

Obviously many modifications and variations of the invention, as hereinbefore set forth, may be made without departing from the spirit and scope thereof and therefore only such limitations should be imposed as are indicated in the appended claims.

What is claimed is:

1. A method for making cellular polyurethane plastics which comprises reacting at a temperature less than 120° C. a compound having the formula::

$$HO—R—X—(R—X)_n—OH$$

wherein R is a divalent organic radical selected from the group consisting of aliphatic and aromatic radicals, X is a member selected from the group consisting of oxygen and sulfur and n is an integer the value of which will result in a molecular weight of said compound being from about 500 to about 3,000, from about 1 percent to about 10 percent, based on the weight of said compound, of a tertiary amine having the formula:

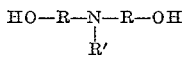

wherein R is an alkylene radical and R' is a member selected from the group consisting of alkyl and cycloalkyl radicals, and an amount of an organic polyisocyanate in a first step to form an intermediate containing tertiary nitrogen atoms and from about 0.3 percent to about 3 percent unreacted hydroxyl groups and reacting the product of said first step with from about 0.5 percent to about 3 percent by weight of water based on the weight of said first mentioned compound and an excess of an organic polyisocyanate, in an amount to provide from about 1.2 to about 3 isocyanato groups for each group reactive therewith in a second step to obtain a cellular polyurethane plastic.

2. A method for making cellular polyurethane plastics which comprises reacting at a temperature less than 120° C. a polythioether prepared by the process which comprises reacting a polyhydric alcohol with a thioether glycol in a molecular ratio of from about 1.1 to about 1:1.5, said polythioether having a molecular weight of from about 500 to about 3,000, from about 1 percent to about 10 percent based on the weight of said polythioether of a tertiary amine having the formula:

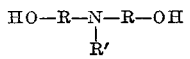

wherein R is an alkylene radical and R' is a member selected from the group consisting of alkyl and cycloalkyl radicals and an amount of an organic polyisocyanate in a first step to form an intermediate containing tertiary nitrogen atoms and from about 0.3 percent to about 3 percent unreacted hydroxyl groups and reacting the product of said first step with from about 0.5 percent to about 3 percent by weight of water based on the weight of said polythioether and an excess of an organic polyisocyanate to provide from about 1.2 to about 3 isocyanato groups per each group reactive therewith in a second step to obtain a cellular polyurethane plastic.

References Cited in the file of this patent

UNITED STATES PATENTS

| 2,726,219 | Hill _____ Dec. 6, 1955 |
| 2,850,464 | Mitchell _____ Sept. 2, 1958 |
| 2,853,472 | Schroeder et al. _____ Sept. 23, 1958 |
| 2,866,762 | Brochhagen et al. _____ Dec. 30, 1958 |
| 2,888,408 | Rogers et al. _____ May 26, 1959 |
| 2,900,368 | Stilmar _____ Aug. 18, 1959 |

FOREIGN PATENTS 731,071    Great Britain _____ June 1, 1955

OTHER REFERENCES

White: "Journal of Soc. Dyers and Colourists," volume 70, No. 11, November 1954, pages 481 to 486.